United States Patent [19]

Macy et al.

[11] Patent Number: 4,970,041

[45] Date of Patent: Nov. 13, 1990

[54] COEXTRUDED STRUCTURES

[75] Inventors: Richard J. Macy; Larry D. Sarver, both of Wexford, Pa.

[73] Assignee: Mobay Corporation, Pittsburgh, Pa.

[21] Appl. No.: 261,662

[22] Filed: Oct. 24, 1988

Related U.S. Application Data

[63] Continuation of Ser. No. 108,189, Oct. 13, 1987, abandoned.

[51] Int. Cl.$^5$ .............................................. B29C 47/06
[52] U.S. Cl. .................................. 264/171; 264/176.1; 264/331.21
[58] Field of Search ...................... 264/171, 173, 176.1, 264/331.21, 512, 514, 515

[56] References Cited

U.S. PATENT DOCUMENTS

| 3,420,729 | 1/1969 | Roberts | 161/7 |
|---|---|---|---|
| 3,524,795 | 8/1970 | Peterson | 264/171 |
| 3,561,629 | 2/1971 | Turner | 215/1 |
| 3,606,958 | 9/1971 | Coffman | 220/63 |
| 3,707,590 | 12/1972 | Wiggins et al. | 264/514 |
| 3,717,544 | 2/1973 | Valyi | 161/252 |
| 3,869,056 | 3/1975 | Valyi | 215/1 C |
| 3,908,070 | 9/1975 | Marzolf | 428/474 |
| 4,092,391 | 5/1978 | Valyi | 264/512 |
| 4,107,362 | 8/1978 | Valyi | 428/35 |
| 4,186,154 | 1/1980 | Binsack et al. | 264/171 |
| 4,269,964 | 5/1981 | Freitag et al. | 528/126 |
| 4,327,137 | 4/1982 | Sawa et al. | 264/512 |
| 4,475,241 | 10/1984 | Mueller et al. | 383/113 |
| 4,540,623 | 9/1985 | Im et al. | 264/171 |
| 4,643,937 | 2/1987 | Dickinson et al. | 264/176.1 |
| 4,659,785 | 4/1987 | Nagano et al. | 525/324 |
| 4,798,526 | 1/1989 | Briggs et al. | 264/515 |

*Primary Examiner*—Jeffery Thurlow
*Attorney, Agent, or Firm*—Joseph C. Gil; Aron Preis

[57] ABSTRACT

The present invention is directed to a, multilayered coextruded thermoplastic structure useful as a packaging material including a barrier layer of polyvinylidene chloride, a polycarbonate layer and an adhesive layer interposed therebetween. The polycarbonate resin of the invention is characterized by its low molecular weight. In a preferred embodiment the polycarbonate is further characterized by its special chain terminating agent.

5 Claims, No Drawings

COEXTRUDED STRUCTURES

This application is a continuation of application Ser. No. 07/108,189 filed Oct. 13, 1987 now abandoned.

FIELD OF THE INVENTION

The invention relates to a multilayered thermoplastic structure having good vapor barrier properties and more particularly to a co-extruded structure comprising a polycarbonate layer, a polyvinylidene chloride layer and a tie (adhesive) layer interposted therebetween.

BACKGROUND OF THE INVENTION

Resistance to the permeation of gases and liquid is a required characteristic of modern packaging materials. In addition these materials are required to have good mechanical properties. While polycarbonate is an excellent material for molding a variety of plastic articles including films and packaging, its barrier properties are somewhat deficient. The combination of polyvinylidene chloride—a material known for its excellent barrier properties—with polycarbonate resins has been alluded to in the literature yet no successful co-extruded structure containing these materials has been reported. U.S. Pat. No. 3,420,729 disclosed an article comprising an outer shell and an inner rigidifier component and an adhesive layer placed therebetween. Polycarbonate is mentioned among the suitable materials for the outer shell. Polyvinylidene chloride (saran) is disclosed in U.S. Pat. Nos. 3,561,629, 3,717,544, 3,908,070 and 4,107,362 to be suitable as the intermediate layer in a laminated article. In U.S. Pat. No. 3,606,958 there was disclosed a container having a wall comprising a load-carrying lamina and a second, sealing lamina. Polycarbonate is listed among the materials suitable for the load-bearing lamina while polyvinylidene chloride is disclosed among the suitable materials for the fluid barrier laminae. Also relevant in this connection is the container disclosed in U.S. Pat. No. 3,869,056. In U.S. Pat. No. 4,475,241 there is disclosed a packaging film which comprises a base sheet having a polycarbonate coating and an adhesive tie layer.

It is perhaps instructive to note that the art regards the coextruded structure of polycarbonate and polyvinylidene to be an impossibility. In a paper entitled "Materials and Components for High Temperature Barrier Packaging," L. E. Baccaro et al (1984 Polymers, Lamination and Coatings Conference, Book 2, Proceedings of the Technical Association of the Pulp and Paper Industry, pp 639) it was noted that among the drawbacks of polyvinylidene chloride is that "with the current coextrusion feedblock systems on the market, it is virtually impossible to process with PC without degradation". In fact, as late as 1987 in an article entitled "A Comparison of Barrier Plastics for Packaging; The packaging composites of EVOH and PVDC" by M. Boysen, Rheinberg, Kunststoffe 77 (1987) 5,pp. 522/525, it was clearly stated that coextrusion of PVDC and polycarbonates is not possible.

SUMMARY OF THE INVENTION

The present invention is directed to a novel, multilayered coextruded thermoplastic structure useful as a packaging material comprising a barrier layer of polyvinylidene chloride, a polycarbonate layer and an adhesive layer interposed therebetween. The polycarbonate resin of the invention is characterized by its low molecular weight. In a preferred embodiment the polycarbonate resin is also characterized by its special chain terminating agent.

DETAILED DESCRIPTION OF THE INVENTION

The polycarbonates of the present invention are thermoplastic aromatic resins having a weight average molecular weight of about 10,000 to about 40,000, particularly 12,000 to 30,000 and preferably 15,000 to 25,000. Polycarbonates of this type are known and are readily available in commerce. The polycarbonate resin of the invention is based on dihydroxy compounds of the formula

$$HO-Z-OH \qquad (II)$$

wherein Z is a divalent aromatic radical having 6-30 carbon atoms. These include both mononuclear and polynuclear dihydroxy compounds, which may contain heteroatoms and may be substituted. The following are among the suitable compounds: hydroquinone, resorcinol, dihydroxydiphenyls, bis-(hydroxyphenyl)-alkanes, bis-(hydroxyphenyl)-cycloalkanes, bis-(hydroxyphenyl) sulphides, bis-(hydroxyphenyl) ethers, bis-(hydroxyphenyl) ketones, bis-(hydroxyphenyl) sulphoxides, bis-(hydroxyphenyl) sulphones and α,α'-bis-(hydroxyphenyl)-diisopropylbenzenes, and their nuclear-alkylated and nuclear-halogenated compounds. These and other suitable dihydroxy compounds are described in U.S. Pat. Nos. 3,028,365; 2,999,835; 3,148,172; 3,271,368; 2,991,273; 3,271,367; 3,280,078; 3,014,891; and 2,999,846, all of which are incorporated herein by reference, in German Offenlegungsschriften Nos. 1,570,703; 2,063,050; 2,036,052; and 2,211,956; French Patent Specification No. 1,561,518 and in the monograph H. Schnell, Chemistry and Physics of Polycarbonates, Interscience Publishers, New York, 1964.

Examples of preferred dihydroxy compounds are: 4,4'-dihydroxydiphenyl, 2,2'-bis-(4-hydroxyphenyl)-propane, 2,4-bis-(4-hydroxyphenyl)-2-methylbutane, 1,1-bis-(4-hydroxyphenyl)-cyclohexane, α,α'-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl) sulphone, 2,4-bis-(3,5-dimethyl-4-hydroxyphenyl)-2-methylbutane, 1,1-bis-(3,5-dimethyl-4-hydroxyphenyl)-cyclohexane, α,α'-bis-(3,5-dimethyl-4-hydroxyphenyl)-p-diisopropyl-benzene, 2,2-bis-(3,5-dichloro-4-hydroxyphenyl)-propane, and 2,2-bis-(3,5-dibromo-4-hydroxyphenyl)-propane.

Examples of particularly preferred dihydroxy compounds are: 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane, and 1,1-bis-(4-hydroxyphenyl)-cyclohexane.

Mixtures of the above mentioned dihydroxy compounds may also be used.

Small amounts of a branching agent, preferably between about 0.05 and 2.0 mol % (relative to diphenols employed) may be added. These are compounds having a functionality of three or more, in particular those with three or more phenolic hydroxyl groups, which are added for the purpose of improving the flow properties. Examples of these compounds include phloroglucinol, 4,6-dimethyl-2,4,6-tri-(4-hydroxyphenyl)-hept-2-ene, 4,6-dimethyl-2,4,6-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis-[4,4-bis-(4-hydroxyphenyl)-cyclohexyl]-propane, 2,4-bis-(4-hydroxyphenylisopropyl)-phenol, 2,6-bis-(2-hydroxy-5'-methylbenzyl)-4-methylphenol, 2-(4-hydroxyphenyl)-2-(2,4-dihydroxyphenyl)-propane, hexa-[4-(4-hydroxyphenylisopropyl)-phenyl] orthoterephthalic acid ester, tetra-(4-hydroxyphenyl)-methane, tetra-[4-(4-hydroxyphenylisopropyl) phenoxy]-methane and 1,4-bis-[(4',4''-dihydroxy-triphenyl)-methyl]-benzene. Other suitable trifunctional compounds are 2,4-dihydroxybenzoic acid, trimesic acid, cyanuric chloride and 3,3-bis-(3-methyl-4-hydroxyphenyl)-2-oxo-2,3-dihydroindole.

The polycarbonates according to the invention are preferably prepared by the phase boundary process (as described for instance in H. Schnell, Chemistry and Physics of Polycarbonates, Polymer Reviews, Volume IX, page 33 et. seq., Interscience Publishers, (1964)), incorporated herein by reference.

Regulating the molecular weight of the polycarbonate resin is attained by use of monohydric aromatic hydroxy compounds. These are well known and include monophenols such as cumylphenol, m- and p-methylphenol, m- and p-ethylphenol, m- and p-propylphenol and m- and p-isopropylphenol, p-bromophenol and m- and p-butylphenol, especially p-tert. butylphenol. The preferred embodiments entail a polycarbonate resin having chain terminators comforming to

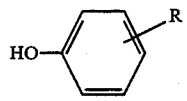  (I)

wherein R represents a branched alkyl radical consisting of 4 to 10 carbon atoms. Most preferred polycarbonate resins having chain terminators of this type have been disclosed in U.S. Pat. No. 4,269,964 which is incorporated herein by reference. The preferred polycarbonates represent an improvement in terms of hydrolysis resistance, critical thickness and mechanical and thermal properties.

Examples of compounds of formula I which are suitable according to the invention are

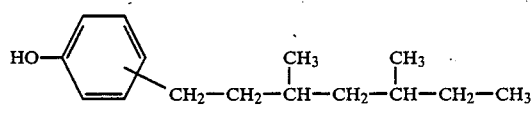  (III)

and

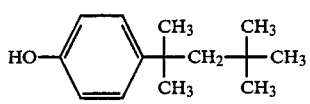  (IV)

Either one compound of formula I or a mixture comprising compounds of formula I may be employed for the preparation of the polycarbonates according to the invention.

Polyvinylidene chloride polymers and copolymers are well known and widely used barrier materials. The barrier resins of the invention are polymers having a high content of vinylidene chloride.

Vinylidene chloride is a vinyl monomer which conforms structurally to

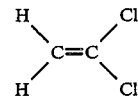

and which upon copolymerization form a variety of useful resins. Saran, a representative resin of this family of resins, is characterized by its low permeability to gases and liquids and flammability resistance.

In the context of the present invention, the barrier layer is preferably a copolymer of vinylidene chloride having a melt point of about 198° to 205° C. and a decomposition temperature of about 210° C.

The barrier material of the invention preferably comprises at least 70 weight percent of vinylidene chloride, the remainder being of one or more of the suitable copolymerizable monomers selected among olefins and substituted olefins including such monomers as unsaturated carboxylic acids, methyl, ethyl, isobutyl, butyl, octyl and 2-ethylhexyl acrylates and methacrylates, phenyl methacrylate, cyclohexyl methacrylate, p-cyclohexyl phenyl methacrylate, chloroethyl methacrylate, 2-nitro-2-methyl-propyl methacrylate and the corresponding esters of acrylic acid, methyl alpha chloroacrylate, octyl alpha-chloro-acrylate, methyl isopropenyl ketone, acrylonitrile, methacrylonitrile, methyl vinyl ketone, vinyl chloride, vinyl acetate, vinyl propionate, vinyl chloroacetate, vinyl bromide, styrene, vinyl naphthalene, ethyl vinyl ether, N-vinyl phthalimide, N-vinyl succinimide, N-vinyl carbazole, isopropenyl acetate, acrylamide, methacrylamide or monoalkyl substitution products thereof, phenyl vinyl ketone, diethyl fumarate, diethyl maleate, methylene diethyl maleate, dichloro vinylidene fluoride, dimethyl itaconate, diethyl itaconate, dibutyl itaconate, vinyl pyridine, maleic anhydride and allyl glycidyl ether.

Since its transmission properties are virtually uneffected by moisture or steam, the barrier resin is ideal for use in food packaging applications. Unfortunately, however, the color of this resin is heat sensitive such that it turns amber-beige upon exposure to a temperature higher than about 350° F. Further, at high temperatures, polyvinylidene chloride undergoes degradation which yields highly corrosive hydrochloric acid.

Polyvinylidene chloride resins are noted for their resistance to gas and liquid permeation. Oxygen permeabilities at 23° C. range from about 0.04 to 1.0 cc-mil/100 in.$^2$-day-atm. and are uneffected by the presence of moisture. Carbon dioxide permeabilities are about 0.1 to 2.4 cc. The permeation of n-hexane is about $10^{-3}$–$10^{-4}$ g-mil/100 in.$^2$-day, while water vapor transmission rates are 0.05 to 0.5 g at 37.8° C. and 90% relative humidity. Among the preferred polyvinylidene chloride resins suitable in the present application is Experimental PVDC Resin XU-32009.00, a product of the Dow Chemical Company. It is characterized by its barrier properties which are summarized as: Oxygen transmission 0.15 cc-mil/100 in.$^2$ 24 hrs. atm @73° F. and 75% RH, ASTM D.1434, water vapor transmission rate 0.10 g mil/100 in.$^2$ 24 hrs. @100° F. and 90% RH, ASTM D-96 and permeability to carbon dioxide 0.25 cc-mil/100 in.$^2$ 24 hrs. atm @ RT.

The barrier properties of the polyvinylidene chloride layer depends on its thickness. In the context of the present invention the trade-off between economics and properties dictates that the thicknesses of the polyvinylidene chloride layer be of the order of about 0.001" to about 0.015", preferably the thickness is about 0.0066" to about 0.012". Excellent properties were obtained in a structure which included a polycarbonate layer (0.005"), an adhesive layer (0.003") and polyvinylidene chloride (0.010").

Typical plasticizers which may be incorporated in the polyvinylidene chloride barrier resin include acetyl tributyl citrate, epoxidized soybean oil, dibutyl sebacate and copolymers of ethylene and vinyl acetate.

The adhesive, tie, layer of the invention serves also as a thermal insulator to at least partially protect the polyvinylidene chloride layer from the high temperatures attendant upon the coextrusion process. Typically the thickness of the adhesive layer is about 0.0005" to 0.005", preferably about 0.001 to 0.003 inches. For an adhesive layer to be suitable in the present context it has to have a relatively low process temperature (less than about 350° F.) and adhere to and be compatible with both the polyvinylidene chloride and the polycarbonate. Further it must contain less than about 0.5 ppm of metal ions. A variety of thermoplastic resins are suitable in promoting the adhesion between the polycarbonate and the polyvinylidene chloride layer of the invention. Among the suitable resins are copolymers of ethylene and vinyl acetate containing about 14 to 40 percent of vinyl acetate and a complementary percentage of ethylene. Also suitable are copolymers of ethylene and acrylate or methacrylic acid esters containing about 30 percent of acrylate or methacrylate and a complementary percentage of ethylene.

The coextrusion process is well known in the art. Any of a number of processes, including the use of a Dow block, Welex block, and a multimanifold die are suitable. In the preparation of the structure described below, use was made of a Cloeren coextrusion block. See for instance U.S. Pat. No. 4,600,550 which is incorporated herein by reference. The structures thus produced are suitable in the preparation of containers, films, or sheets where excellent barrier properties are desired.

Structures within the scope of the invention have been prepared and their properties evaluated. Among the suitable structures there was prepared a coextruded sheet consisting of the following successive layers: polycarbonate, adhesive, barrier layer, adhesive, polycarbonate. In these structures the adhesive layer was Plexar 3342 and the barrier layer was Dow Chemicals XU 32009.05. The polycarbonate was a homopolymer based on bisphenol-A having a molecular weight of about 25,000, characterized in that its chain terminator conforms to formula (1) above. The melt temperature of the polycarbonate was about 430° F. (measured at the center of the die).

The structure coextruded in accordance with the invention may contain additional coextruded layers including conventional polycarbonate resins as long as the additional layers are separated from the polyvinylidene chloride layer by the polycarbonate resin of the invention.

In coextruding the structure of the invention it is important to operate the polycarbonate extruder at a low to medium shear screw and at a low rpm in order to maintain as low a melt temperature as possible. Preferably, the speed should be below 40 rpm. It is also important that the screw in the polycarbonate extruder contain no high-shear mixing elements, i.e., Maddox. In addition the following should be noted: the polyvinylidene chloride must have a short residence time in the extruder adapter and die in order to minimize degradation.

The flow rate of the combined, multilayer structure through the coextrusion adapter and die or through the multimanifold die should be high, to minimize residence time.

The extruded multilayer melt must be cooled immediately. The conventional technique is to extrude onto a temperature controlled metal roll such as a 3-roll stack. The contact roll, center roll in this case, should have a cooler temperature than would normally be used for polycarbonate; a 30° C. difference is desirable.

The adhesive layer must be thick enough to insulate the barrier layer from the polycarbonate layer from the time the layers come together until they are cooled on the roll stack; a typical thickness is 2 mils.

The parameters set forth below describe the coextrusion process which was used in demonstrating the invention.

Equipment:

Extruder A: Davis Standard 2½", 30:1 unvented extruder, medium shear screw.

Extruder B: Davis Standard 2½", 30:1 unvented extruder, low shear screw.

Extruder C: Davis Standard 1½", 24:1 unvented extruder

Extruder D: Davis Standard 1½", 24:1 polyvinylidene chloride

| Extruder<br>Material | A<br>Polycarbonate | B<br>Polycarbonate | C<br>Plexar 3342 | D<br>Dow Chemicals<br>XU 32009.05 |
| --- | --- | --- | --- | --- |
| Temp Zone | | | | |
| 1, °F. | 470 | 470 | 350 | 325 |
| 2, °F. | 465 | 470 | 340 | 300 |
| 3, °F. | 440 | 440 | 340 | 300 |
| 4, °F. | 440 | 400 | 340 | 300 |
| Clamp °F. | 440 | 440 | 340 | 300 |
| Adapter °F. | 440 | 440 | — | 300 |
| Feed Block °F. | 410 | | | |
| Feed Block, °F. | 410 | | | |
| Die 1, °F. | 430 | | | |
| Die 2, °F. | 430 | | | |
| Die 3, °F. | 430 | | | |
| Roll Temp., | | | | |
| Top °F. | 200 | | | |
| Middle °F. | 175 | | | |

| Extruder | A | B | C | D |
|---|---|---|---|---|
| Material | Polycarbonate | Polycarbonate | Plexar 3342 | Dow Chemicals XU 32009.05 |
| Bottom °F. | 200 | | | |

The invention thus described is not limited by any specific coextrusion technique for forming thermoplastic multilayered structures. Neither is the invention limited in terms of the thickness or flexibility of the layers. While the invention has been illustrated with reference to specific details, changes and modifications made therein do not amount to a departure from the scope of the invention.

What is claimed is:

1. A process for the preparation for a multilayered structure comprising coextruding a barrier layer, a polycarbonate layer and an adhesive layer interposed therebetween characterized in that said barrier layer comprises a copolymer which contains at least 70% by weight of vinylidene chloride and one or more olefins or substituted olefins, said polycarbonate having a weight average molecular weight of about 12,000 to 30,000 and said adhesive layer comprising a copolymer of ethylene and at least one monomer selected from the group consisting of acrylic acid, methacrylic acid acetic acid and the corresponding esters of said acids.

2. The process of claim 1 wherein said polycarbonate is further characterized in that its structure comprises a residue of a chain stopper conforming to

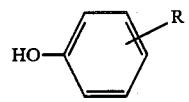

wherein R is a branched $C_4$–$C_{10}$ alkyl radical.

3. The process of claim 1 wherein said coextruding is carried out at a sufficiently low RPM to minimize the process temperature.

4. The process of claim 1 wherein said coextruding comprises using an extruder adapter and wherein said polyvinylidene chloride is processed so as to have a short residence time in said extruder adapter said residence time is selected to minimize degradation of the resin.

5. The process of claim 1 further characterized in that said multilayered structure is extruded onto a temperature controlled metal roll.

* * * * *